(12) United States Patent
Voelkle (10) Patent No.: US 10,786,942 B2
(45) Date of Patent: Sep. 29, 2020

(54) PROCESS FOR THE PRODUCTION OF A TUBULAR HYBRID MOLDING AND TUBULAR HYBRID MOLDING

(71) Applicant: DIEHL AVIATION LAUPHEIM GMBH, Laupheim (DE)

(72) Inventor: Dietmar Voelkle, Biberach (DE)

(73) Assignee: Diehl Aviation Laupheim GmbH, Laupheim (DE)

(*) Notice: Subject to any disclaimer, the term of this patent is extended or adjusted under 35 U.S.C. 154(b) by 0 days.

(21) Appl. No.: 16/128,735

(22) Filed: Sep. 12, 2018

(65) Prior Publication Data

US 2019/0077069 A1 Mar. 14, 2019

(30) Foreign Application Priority Data

Sep. 12, 2017 (DE) .................. 10 2017 008 189

(51) Int. Cl.
| | | |
|---|---|---|
| *B29C 61/02* | (2006.01) | |
| *F16L 9/14* | (2006.01) | |
| *B29C 35/02* | (2006.01) | |
| *B29L 23/00* | (2006.01) | |
| *B29K 105/04* | (2006.01) | |
| *B29K 105/08* | (2006.01) | |
| *B29K 27/00* | (2006.01) | |

(52) U.S. Cl.
CPC ............ *B29C 61/025* (2013.01); *B29C 35/02* (2013.01); *F16L 9/14* (2013.01); *B29K 2027/14* (2013.01); *B29K 2027/16* (2013.01); *B29K 2105/046* (2013.01); *B29K 2105/0872* (2013.01); *B29L 2023/22* (2013.01)

(58) Field of Classification Search
CPC .................................................. B29C 61/025
See application file for complete search history.

(56) References Cited

U.S. PATENT DOCUMENTS

| 8,006,722 B2 | 8/2011 | Hesse et al. |
| 2015/0217536 A1 | 8/2015 | Hoefle et al. |

FOREIGN PATENT DOCUMENTS

| DE | 3838866 A1 | 5/1990 |
| DE | 102005023148 A1 | 11/2006 |
| DE | 102013002893 A1 | 8/2014 |

*Primary Examiner* — Larry W Thrower
(74) *Attorney, Agent, or Firm* — Laurence A. Greenberg; Werner H. Stemer; Ralph E. Locher

(57) ABSTRACT

A process produces a tubular hybrid molding made of a plastics foam element that exhibits temperature-dependent shrinkage and a fiber-plastics composite. The method includes inserting the plastics foam element, unhardened first and second fiber-plastics composite sections into a mold, where the plastics foam element has open pores at locations in contact with the fiber-plastics composite. The plastics foam element and the fiber-plastics composite sections are shaped by the mold. The mold is exposed to a first temperature to minimize the viscosity of the resin in the fiber-plastics composite. The mold is exposed to a second temperature to harden the fiber-plastics composite and to achieve mechanical fixing of the plastics foam element thereon. The mold is exposed to a third temperature to shrink the plastics foam element and cause its shape to conform to that of the mold and achieve a final shape of the said element.

18 Claims, 6 Drawing Sheets

PROCESS FOR THE PRODUCTION OF A TUBULAR HYBRID MOLDING AND TUBULAR HYBRID MOLDING

CROSS-REFERENCE TO RELATED APPLICATION

This application claims the priority, under 35 U.S.C. § 119, of German application DE 10 2017 008 189.1, filed Sep. 12, 2017; the prior application is herewith incorporated by reference in its entirety.

BACKGROUND OF THE INVENTION

Field of the Invention

The invention relates to a process for the production of a tubular hybrid molding and to a tubular hybrid molding.

Published, non-prosecuted German patent application DE 10 2013 002 893 A1, corresponding to U.S. patent publication No. 2015/0217536, discloses a process for the production of a hybrid molding where a plastics foam element and a fiber-plastics composite are bonded to one another to give a laminate. The production process is in particular suitable for the production of pipes. Hybrid moldings of this type are used in particular in the airline sector, and also in other vehicles for conveying people and for conveying freight. Hybrid moldings of this type can in particular be used as pipes for conveying air for the air-conditioning of a vehicle, in particular of an aircraft. There is a need for dimensionally stable hybrid moldings which in particular are suitable for use at elevated temperature.

SUMMARY OF THE INVENTION

It is an object of the invention to eliminate the disadvantages of the prior art. A particular intention is to provide a process for the production of a hybrid molding that is dimensionally stable and suitable for use at elevated temperature.

The invention proposes a process for the production of a tubular hybrid molding made of a plastics foam element and fiber-plastics composite. The process uses a plastics foam element which has temperature-dependent shrinkage. The process includes the following steps:

a) insertion of the plastics foam element and of at least one unhardened first fiber-plastics composite section and of at least one unhardened second fiber-plastics composite section into a mold, where the first fiber-plastics composite section is inserted along one lateral edge of the plastics foam element and the second fiber-plastics composite section at least to some extent covers the plastics foam element, where those regions of the surface of the plastics foam element covered by fiber-plastics composite sections have open pores.

b) shaping of the plastics foam element and of the at least one first fiber-plastics composite section and second fiber-plastics composite section by means of the mold to give a preliminary shape in a manner such that the first fiber-plastics composite section forms a sandwich structure with two lateral edges of the plastics foam element. In particular, the plastics foam element provided or used takes the form of molded sheets. The shaping is in particular insertion of plastics foam elements under pressure into a mold, in particular with use of clamps, etc.

c) exposure of the mold to a first temperature TF which is suitable to reduce the viscosity of the resin in the fiber-plastics composite (i.e. in the fiber-plastics composite sections) to a minimum. The minimum is that exhibited by the resin as a consequence of the temperature. The resin here escapes from the fiber-plastics composite and wets the plastics foam element or penetrates peripherally into the open pores of the plastics foam element. In step c), therefore, the temperature TF is approached, and the viscosity of the resin in the fiber-plastics composite here (i.e. in the fiber-plastics composite sections) falls to its minimum as a consequence of the temperature. The temperature TF here is in particular maintained for a certain period that is sufficient to achieve the viscosity minimum or to cause the resin to achieve sufficient wetting of, or penetration into, the plastics foam element. It is also possible that the temperature passes through the temperature TF within a range of temperatures surrounding the temperature TF—without remaining at the said temperature TF. The effect brought about here is the same, namely sufficient liquefaction and penetration of the resin into the plastics foam element.

d) exposure of the mold to a second temperature T1 which is higher than the temperature TF and which is suitable to harden the fiber-plastics composite sections in respect of the resin thereof, and which lies between the glass transition temperature and the melting point of the plastics foam element, where the plastics foam element becomes fixed mechanically on the fiber-plastics composite. The corresponding regions of the plastics foam element thus become mechanically fixed on the fiber-plastics composite, and at the same time the fiber-plastics composites are hardened to give mechanically stable frame elements or supportive structures or retentive structures. From this juncture onwards, the plastics foam element is held on this frame structure made of fiber-plastics composites and, by means of the fixed regions, has restricted opportunities for shrinkage. The bond between plastics foam element and fiber-plastics composite is mainly achieved via mechanical means: the resin that has penetrated into the pores is secured mechanically via interlocking, etc., at or in the open pores of the plastics foam element. This can be described pictorially as a type of "claw-rip" effect. The principles of the statements above relating to step c) are equally applicable to step d): here again, therefore, the temperature T1 is approached and the resin is hardened. The temperature T1 is in particular maintained here for a certain period that is adequate for sufficient hardening of the resin. It is also possible that the temperature passes through the temperature T1 within a range of temperatures surrounding the temperature T1—without remaining at the temperature T1. The effect brought about here is the same, namely sufficient hardening of the resin.

e) exposure of the mold to a third temperature TS which is higher than the temperature T1 and which is suitable to bring about shrinkage in the plastics foam element, in order that its shape conforms to that of the mold, and to achieve a final shape of the plastics foam element. The shrinkage is used here in a controlled manner at those regions where shrinkage is not restricted by the frame structure. The design of the frame structure here is in particular such that the desired final shape can be produced. Use is made here of the discovery that by way of example, compressed (not fixed) regions shrink more than the fixed regions. Surface regions that have been compressed and thus by way of example corrugated then become smooth by virtue of the shrinkage that occurs there, i.e. are "tension-smoothed". The hybrid molding per se is thus manufactured from the corresponding components: plastics foam element and fiber-plastics composite sections. The principles of the statements above relating to step c) and d) are equally applicable to step e):

here again, therefore, the temperature TS is approached and the plastics foam element is subjected to sufficient shrinkage in order that its shape conforms to that of the mold and most importantly to the desired shape. The temperature TS is in particular maintained here for a certain period that is sufficient to achieve the shape. It is also possible that the temperature passes through the temperature TS within a range of temperatures surrounding the temperature TS—without remaining at the temperature TS. The effect brought about here is the same, namely sufficient shaping via shrinkage.

f) cooling of the mold and removal of the hybrid molding.

The expression "fiber-plastics composite" denotes a composite made of fibers with a plastic, i.e. a composite material. In order to improve clarity for the purposes of the present invention, the simplified and generalized term "resin" is used for the "plastic". In particular, the intended meaning here is a textile that has been impregnated by a resin per se or by a thermally hardening plastic, and that hardens when exposed to an elevated temperature. This type of hardening plastic material is termed a thermoset or a thermoset material. As long as the fiber-plastics composite has not been hardened, its shape can easily be changed. An unhardened fiber-plastics composite can be shaped by trimming. The first fiber-plastics composite section and/or the second fiber-plastics composite section is/are advantageously rectangular.

Improved dimensional stability of the tubular hybrid molding produced according to the invention is achieved via the selection of the second temperature T1, which lies between the glass transition temperature and the melting point of plastics foam element.

In summary, therefore, the process for the production of a tubular hybrid molding made of a plastics foam element with temperature-dependent shrinkage and fiber-plastics composite has the following steps:

a) insertion of the plastics foam element and of unhardened first and second fiber-plastics composite sections into a mold, where the plastics foam element has open pores at locations in contact with the fiber-plastics composite,
b) shaping of the plastics foam element and of the fiber-plastics composite sections by means of the mold to give a preliminary shape,
c) exposure of the mold to a first temperature TF in order to minimize the viscosity of the resin in the fiber-plastics composite,
d) exposure of the mold to a second temperature T1>TF in order to harden the fiber-plastics composite and to achieve mechanical fixing of the plastics foam element thereon, and
e) exposure of the mold to a third temperature TS>T1 in order to shrink the plastics foam element and cause its shape to conform to that of the mold and achieve a final shape of the said element,
f) cooling of the mold and removal of the hybrid molding.

The plastics foam element can be a sheet-type plastics foam element or a plastics foam element that has already been shaped. At the second temperature T1, this type of plastics foam element assumes the desired preliminary shape by virtue of local application of tension or local application of pressure, and it then assumes the desired final shape via shrinkage. Compressed foam regions shrink here to a greater extent than regions subject to tension. After cooling of the hybrid molding, internal stresses are thus reduced and increased dimensional stability is achieved.

The temperature T1 can in particular lie between 60° C. and 200° C., in particular between 60° C. and 120° C. The material of the plastics foam element and the material of the fiber-plastics composites are selected appropriately for one another here in a manner that also permits hardening of the fiber-plastics composite in this temperature range T1.

The first fiber-plastics composite section is preferably inserted in the longitudinal direction of the tubular hybrid molding at a first lateral edge of the plastics foam element, the opposite lateral edge of the plastics foam element then being placed thereon in a manner such that the first fiber-plastics composite section forms a seam of the hybrid molding. The first fiber-composite section and the two lateral edges of the plastics foam element form a sandwich structure.

The hybrid molding is advantageously released spontaneously from the mold on cooling of the mold in a manner such that no subsequent demolding step is required.

In an advantageous embodiment, the fiber-plastics composite sections are arranged along various directions of the plastics foam element in a manner such that the shrinkage of the hybrid molding is restricted to a prescribed shrinkage length. In particular, the shrinkage length in the usage temperature range, i.e. the range of the third temperature TS, is restricted.

In another advantageous embodiment, the first fiber-plastics composite section is covered by a plurality of second fiber-plastics composite sections at a distance from one another. The second fiber-plastics composite sections can in particular be fiber-plastics composite sections in the form of strips, the orientation of which can be in various directions. It is thus possible to stabilize the hybrid molding in various directions.

The plastics foam element has advantageously been produced from foam of density from 5 to 100 kg/m3.

In particular, the plastics foam element has been produced from a foam made of polyvinylidene fluoride (PVDF) or polyvinyl fluoride (PVF), where the melting point of PVF is about 200° C. and the melting point of PVDF is about 175° C.

The fiber-plastics composite sections can in particular comprise glass fibers or carbon fibers. The fibers can have various orientations in the different fiber-plastics composite sections.

In another advantageous embodiment, the at least one second fiber-plastics composite section is inserted after the plastics foam element in a manner such that it is arranged internally within the hybrid molding. Possible thermal stress to which the hybrid molding is exposed during use by way of example as air-conditioning pipe can be particularly high internally, and internally situated fiber-plastics composite sections increase the heat resistance of the hybrid molding. In this embodiment, the at least one second fiber-plastics composite section can cover the entire area of the plastics foam element. Introduction of a fiber-plastics composite layer over the entire area on the internal side of the hybrid molding considerably improves the heat resistance of the hybrid molding in a manner such that the temperature of a fluid flowing into the hybrid molding can, for a short period, exceed the melting point of the plastics foam element.

When the entire area of the internal side of the plastics foam element is covered, the plastics foam element can have been produced from open-pore foam.

In a preferred embodiment of the process, the plastics foam element is/has been produced from a closed-pore foam where before the step a) the plastics foam element is trimmed at at least the surface regions that are to be fixed mechanically on the fiber-plastics composite. The regions to be wetted subsequently with resin, where the adhesive bonding or adhesion of the resin is to take place, therefore have open pores, in order to permit the abovementioned mechanical fixing. If the plastics foam element already has open pores—at least at the surface—the step can be omitted.

In another embodiment, the process of the invention comprises the step of the insertion of at least one third fiber-plastics composite section where the third fiber-plastics composite section is inserted before the plastics foam element in a manner such that the third fiber-plastics composite section is arranged at an external side of the hybrid molding.

In this case it is possible to arrange third fiber-plastics composite sections and a fourth fiber-plastics composite section in the form of a strip in a manner such that the plastics foam element is stabilized in a skeletal matrix, in particular in a thorax-shaped matrix. The third fiber-plastics composite sections and the fourth fiber-plastics composite sections can have been produced from the same fiber-plastics composite; alternatively it is possible by way of example to use different fiber-plastics composites for the fourth fiber-plastics composite section and the third fiber-plastics composite sections, where these have a similar hardening temperature but by way of example have different fiber reinforcement.

In one embodiment, the plastics foam element can be shaped according to step b) with at least one first fiber-plastics composite section and with at least one second fiber-plastics composite section. The at least one second fiber-plastics composite section is arranged on the internal side and according to steps c) and d) the system is exposed to the temperatures TF and T1 and then is removed from the mold. The resultant intermediate product is then with at least one third fiber-plastics composite section and/or fourth fiber-plastics composite section is placed according to steps a) and b) into a further mold (or optionally the same mold) and there according to steps c) to f) undergoes finishing processes in a manner such that the third fiber-plastics composite section and/or fourth fiber-plastics composite section is arranged on an external side of the hybrid molding.

In an advantageous embodiment, the fiber-plastics composite sections can be arranged in a plurality of layers.

In another advantageous embodiment, it is possible that at least one of the second fiber-plastics composite sections is inserted on at least one side of the plastics foam element in a manner such that a pipe end piece is formed therefrom. Alternatively or additionally, it is possible that at least one of the third fiber-plastics composite sections is inserted on at least one side of the plastics foam element in a manner such that a pipe end piece is formed therefrom. In particular, second and third fiber-plastics composite sections are advantageously inserted on mutually opposite sides of the plastics foam element in a manner such that they to some extent cover the plastics foam element and to some extent exclusively cover the respective other fiber-plastics composite section, thus forming a pipe end piece consisting exclusively of fiber-plastics composite.

In a preferred embodiment of the process, the temperature T1 is selected in a manner such that the value of the shear modulus of the plastics foam element has fallen at most to 50% of its value at 20° C., in particular at most to 60% or 70% or 80% or 85% or 90% or 95%. It is thus ensured that at all times before the hardening of the resin and therefore the fixing of the plastics foam element on the fiber-plastics composite there is no onset of substantial or discernible shrinkage of the plastics foam element, and that therefore the preliminary shape is retained within a desired tolerance at all times before the mechanical fixing takes place.

In a preferred embodiment of the process, at a juncture no later than the start of the step e), preferably d), preferably c), preferably b), preferably a), a pressurizer is inserted into the cavity of the tubular hybrid molding to be produced, and at a juncture no later than during the step e), preferably d), preferably c), preferably b), the pressurizer is used to exert an internal pressure onto the plastics foam element. This results in pressing of the external surface onto the mold and/or smoothing the internal surface and/or provision of additional support to the plastics foam element and/or to the fiber-plastics composite. The pressurizer is in particular a pressure hose, in particular a silicone product or a silicone hose. The pressure can be applied here directly to the plastics foam element, or else via other intervening components, e.g. fiber-plastics composite sections.

The invention also provides a tubular hybrid molding produced by the process of the invention.

The invention is based on the following discoveries, observations and considerations, and also comprises the embodiments below. In the interests of simplicity, the expression "the invention" is also sometimes used for the embodiments. The embodiments here can also comprise parts or combinations of the abovementioned embodiments or correspond thereto and/or where appropriate can also include embodiments not mentioned hitherto.

The invention is based on the now described considerations.

Plastics foams are produced via expansion of the gases dissolved in the melt. These gases are introduced directly into the melt or are produced by the decomposition of chemical blowing agents. Foams which are highly expanded and therefore have very low weight are produced by very rapid cooling of the expanded melt. This prevents excessive cell growth (large cavities) and uncontrolled bursting of the cells (open-cell foams).

It is also possible to use an autoclave process for foaming of previously extruded semi finished products. The semi finished product here is loaded with a blowing gas under high pressure. The gas-loaded semi finished product is then foamed at low pressure and elevated temperature. Here again, it is highly advisable to establish an equilibrium between cell growth and decreasing viscosity as a consequence of temperature reduction.

The (rapid) cooling in the process to produce thermoplastic foams of low density (<100 kg/m3) causes "freezing" of the polymer structure. The polymer chains here exhibit orientation. This is caused by the formation of cell structures (a high degree of stretching of the cell wall). This energetically unfavourable condition of the polymer chains is therefore initially frozen. Associated therewith there are also internal stresses in the cell walls, another term used here being "frozen stresses".

The internal stresses bring about a viscoelastic shrinkage behavior. The volume of a foamed molding is therefore subject to almost continuous decrease. Within a low temperature range, i.e. significantly below the glass transition temperature or the melting range, there is very little evidence of this viscoelastic behavior. Here again, the expression frozen shrinkage behavior is applicable. This shrinkage behavior is highly dependent on the grade or type of polymer used to produce the foam.

Low-weight foams made of fluoropolymers (e.g. PVDF or PVF) exhibit a significant level of shrinkage behavior even at slightly elevated temperatures (from about 60° C.). This can be explained via the increased occurrence of sliding effects involving the oriented macromolecules. These sliding effects occur at temperatures of Tg+20° C. The macromolecules thus return to their preferred tangled shape.

The shrinkage behavior is non-directional. Directionality can be observed only when orientation of the cells (inhomogeneous cell shape) is brought about by manufacturing processes during foaming. This is generally caused by temperature differences or differences in blowing agent loadings in the melt.

Semifinished products in the form of sheets made of foams of this type therefore exhibit the same percentage shrinkage in all directions. The main noticeable effects are the significant changes of the length and width of the sheets (large and easily measurable changes of the sheet dimensions).

The invention is based on the discovery that fixing of the sheets in length and width direction (clamping of the sheet at its edges) can prevent shrinkage in these directions (equilibrium of forces between internal stresses in these directions and external reaction force). Shrinkage of the sheet thickness between upper and lower side can likewise be prevented by fixing.

The invention is therefore based on the concept of production of moldings starting from foam sheets with imposition of shape in a shaping mold. The foam sheets here are inserted under pressure into a mold at room temperature. At the same time, composite material is concomitantly inserted at the required locations. The shape of the molding is changed by the pressure exerted by the mold and by exposure to elevated temperature. At the same time, the composite material hardens and bonds securely to the foam material. At a higher level of detail, the change of shape results from partial shrinkage. The shrinkage here is orientated in accordance with the relevant change-of-shape forces. Compressed foam regions shrink to a greater extent than the regions that are fixed by the composite. These partially differing shrinkage effects permit, for example, the production of pipes or other moldings from flat foam sheets with no recovery effects after removal from the mold.

The invention is also based on the following considerations or discoveries:

Thermosets exhibit a parabolic viscosity curve. On the one hand, additional cross linking increases the viscosity, and on the other hand increasing temperature reduces viscosity.

An important variable in the formation of networks by thermosets is the time required for initial formation of a continuous pathway by way of covalent bonds through the entirety of a sample. At this theoretical point the viscosity becomes infinite.

The invention is therefore also based on the concept of matching the resin system to the thermoplastic foam system in order to develop the mode of construction of the present hybrid molding ("foam ducts"). The changes of thermal and rheological parameters must therefore be selected to be appropriate to one another.

In the case of the resin, the situation is that the viscosity of the resin (in the prepreg, i.e. fiber-plastics composite) initially decreases with increasing temperature in the mold. The decreasing viscosity causes ideal wetting of the surface of the thermoplastic foam (plastics foam element or surface thereof). With passage of time and increasing temperature here, the viscosity passes through a minimum. This viscosity minimum, due to the precrosslinking of the resin in the prepreg, is selected appropriately for the wetting requirements of the foam.

In a specific case, by way of example, the surfaces of the PVDF foam have open pores. The open pores are in particular produced via the cutting of foam blocks (closed foam cells) to give foam sheets.

When the viscosity achieved is in the region of the minimal viscosity, the resin wets the surface and additionally penetrates into the open cell structure. A bond, or incipient bond, between prepreg and foam is thus produced. In particular, penetration into the open cells is essential for obtaining a durable bond to a PVDF material, which by virtue of its chemical structure in fact is not amenable to durable adhesive bonding.

The position (juncture) and the value of the minimum are therefore the decisive processing precondition for the production of the hybrid moldings in the form of the "foam ducts".

The precrosslinking of the resin permits the setting of the viscosity minimum in conjunction with the defined processing temperatures in the process for producing the "foam ducts". Specifically, it is the reaction conversion in the prepreg that is predefined here. The reaction kinetics follow from this frozen conversion. These reaction kinetics are defined not only by the viscosity but also by what is known as the gel point (tan $\delta$=G"/G' being about 1).

The following phenomena occur during processing in the mold as a result of the differing properties of the materials in conjunction with the curing temperature and the time:
1. The viscosity of the resin initially falls with rising temperature in the mold.
2. The resin flows out of the prepreg to some extent and wets the foam. Resin here also flows into the surface pores of the foam material.
3. With further temperature rise, the viscosity of the resin rises as a consequence of cross linking.
4. During further temperature rise in the mold, the thermoplastic foam begins to shrink. The shrinkage process brings about conformity to the shape of the mold (see italic text above). This is optionally assisted via internal pressure in the mold.
5. The increasing cross linking of the resin changes the resin from a viscous liquid to a solid. The prepreg here becomes durably bonded to the foam material. The tendency of the thermoplastic foam to shrink is suppressed by fixing by the increasingly cured prepreg (composite made of resin and textile).

Other features which are considered as characteristic for the invention are set forth in the appended claims.

Although the invention is illustrated and described herein as embodied in a process for the production of a tubular hybrid molding and a tubular hybrid molding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
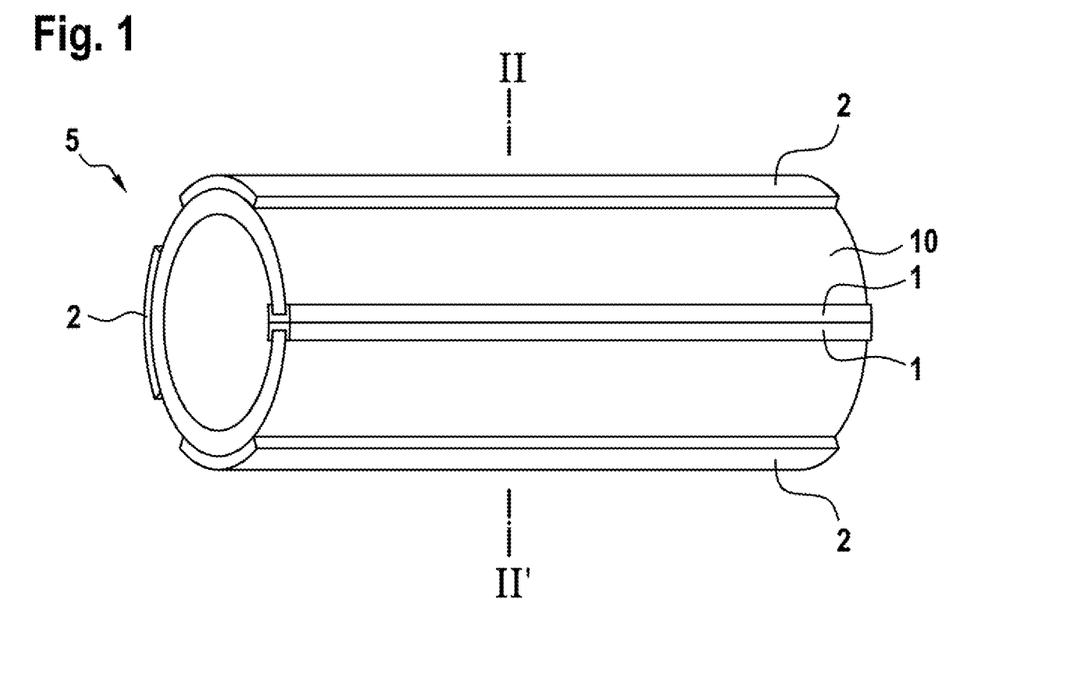
FIG. 1 is a diagrammatic, perspective view of a first embodiment of a hybrid molding according to the invention.

Referring now to the figures of the drawings in detail and first, particularly to FIG. 1 thereof, there is shown a hybrid molding 5 produced by the process described, with a plastics foam element 10 and with a first fiber-plastics composite section 1. The plastics foam element 10 has been produced from a plastics foam element in the form of a sheet, and the first fiber-plastics composite section 1 has been produced from a rectangular fiber-plastics composite section. The plastics foam element 10 and the first fiber-plastics composite section 1 are bonded to one another in a manner such that the first fiber-plastics composite section 1 closes the curved plastics foam element 10 to give a closed pipe. Arranged on the external side of the plastics foam element 10 there are two fiber-plastics composite sections 2. In this Inventive Example, the two fiber-plastics composite sections 2 extend in the longitudinal direction of the tubular hybrid molding 5. This type of second fiber-plastics composite section 2 can also at least to some extent cover the first fiber-plastics composite section 1.

Figure 2:
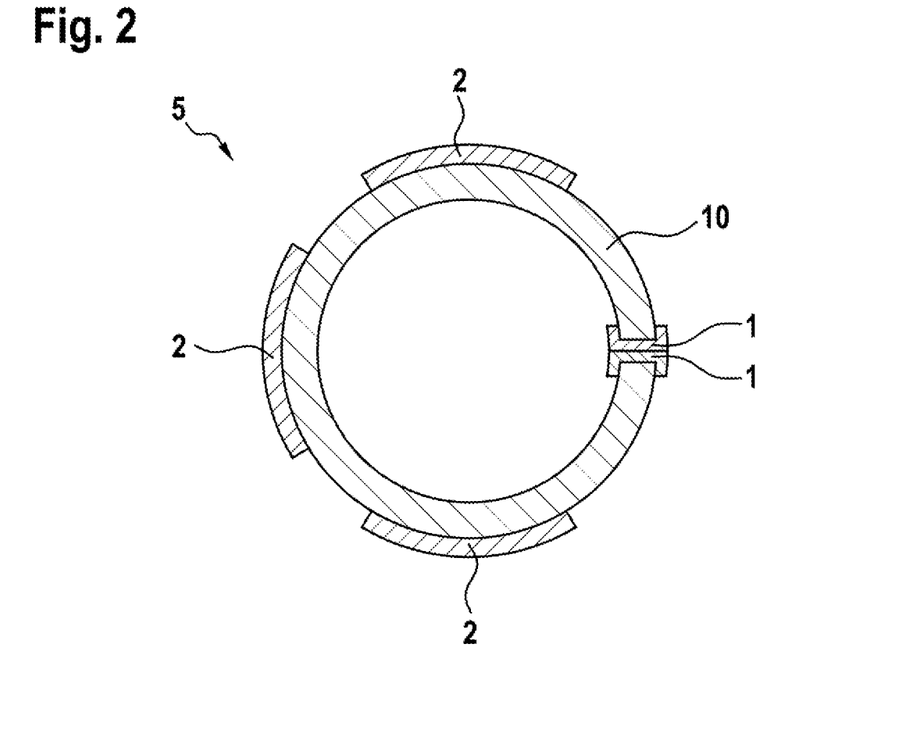
FIG. 2 is a cross-sectional view through the hybrid molding according to FIG. 1 take along the section line II-II'.

FIG. 2 shows the cross section of the hybrid molding 5 shown in FIG. 1. The first fiber-plastics composite section 1 has been inserted between two opposite lateral edges of the plastics foam element 10 in a manner such that the first fiber-plastics composite section 1 forms a sandwich structure with the plastics foam element 10. The second fiber-plastics composite sections 2 at least to some extent cover the plastics foam element 10. In this type of embodiment, the plastics foam element 10 has been produced from closed-pore foam in a manner such that the internal side of the pipe and the external side of the pipe are separated from one another.

For the production of the hybrid molding 5 shown in FIG. 1 and FIG. 2, two fiber-plastics composite sections 2 are first inserted into a mold. The second fiber-plastics composite sections 2 have not been hardened here, and can have a rectangular shape. The plastics foam element 10 is arranged thereon. The plastics foam element 10 is a rectangular plastics foam sheet with temperature-dependent shrinkage. First fiber-plastics composite sections 1 are arranged at one or two opposite lateral edges of the plastics foam element 10. These first fiber-plastics composite sections 1 cover the lateral edge and can extent onto the surfaces of the plastics foam element 10 in a manner such that the first fiber-plastics composite sections 1 form a U-profile around the lateral edge of the plastics foam element 10. Those regions of the surface of the plastics foam element 10 that are covered by fiber-plastics composite sections 1, 2 have open pores. When the mold is closed, a sandwich structure is formed from the first fiber-plastics composite sections 1 and two opposite edges of the plastics foam element 10.

Figure 3:
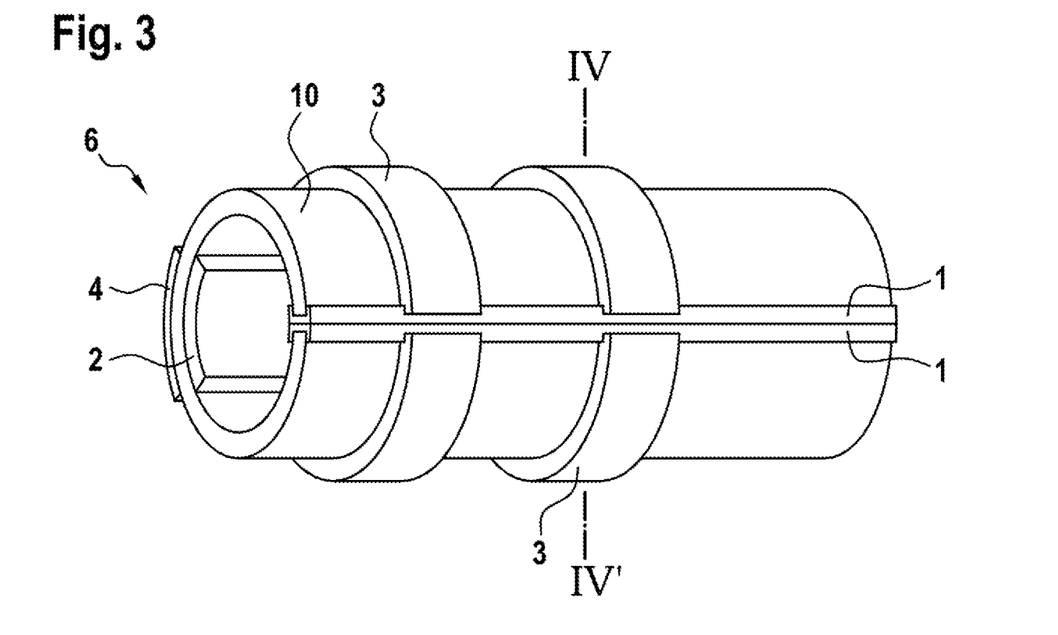
FIG. 3 is a perspective view of a second embodiment of a hybrid molding according to the invention.

FIG. 3 shows a second embodiment of a hybrid molding 6 produced by the process described. Again, the plastics foam element 10 has been closed via the first fiber-plastics composite section 1. In an alternative embodiment, it is also possible that two plastics foam elements 10 form a closed pipe with two first fiber-plastics composite sections 1.

Figure 4:
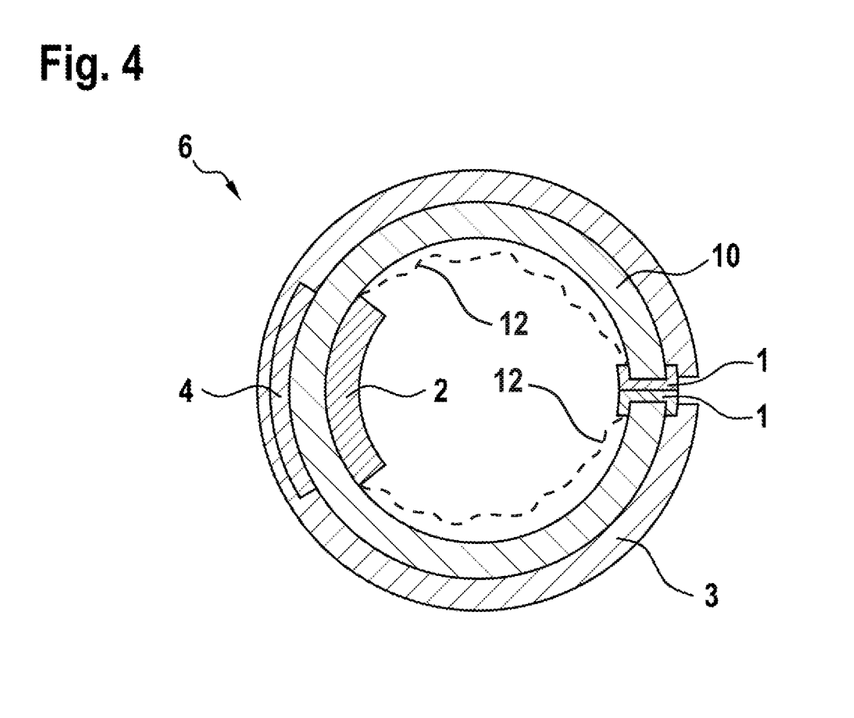
FIG. 4 is a cross-sectional view through the hybrid molding according to FIG. 3 taken along the section line IV-IV'.

There is a second fiber-plastics composite section 2 arranged on an internal side of the pipe, see in particular FIG. 4. The second fiber-plastics composite section 2 can extend in a longitudinal direction of the tubular hybrid molding 6. Arranged on an external side of the plastics foam element 10 are a fourth fiber-plastics composite section 4, which likewise extends in a longitudinal direction of the hybrid molding 6, and also, arranged perpendicularly thereto, third fiber-plastics composite sections 3 running in circumferential direction. The third fiber-plastics composite sections 3 are, as can be seen in FIG. 3, arranged at a distance from one another and have a rectangular basal shape. The fourth fiber-plastics composite section 4 can be arranged between the third fiber-plastics composite sections 3 and the plastics foam element 10, or the third fiber-plastics composite sections 3 can be arranged between the fourth fiber-plastics composite section 4 and the plastics foam element 10. In this type of embodiment with first fiber-plastics composite sections 1, second fiber-plastics composite sections 2, third fiber-plastics composite sections 3 and fourth fiber-plastics composite sections 4 it is possible to use different fiber-plastics composites in order to achieve a certain strength, stiffness and dimensional stability of the hybrid molding 6.

Figure 5:
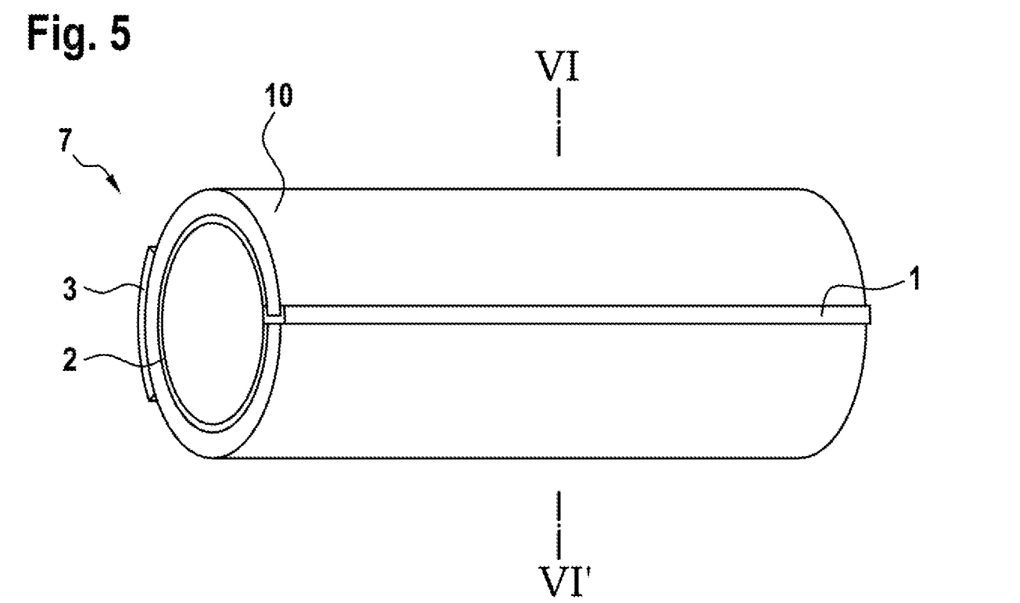
FIG. 5 is a perspective view of a third embodiment of a hybrid molding of the invention.

FIG. 5 shows a third embodiment of the hybrid molding. As can be seen in particular from the cross section according to FIG. 6, in this embodiment the second fiber-plastics composite section 2 covers the entire area of the plastics foam element 10. The entire area of the internal side of the tubular hybrid molding 7 is thus lined by second fiber-plastics composite sections 2. This type of embodiment is in particular suitable for use with short-term increases of internal temperature. For a few minutes, the internal temperature can be above the melting point of the plastics foam element 10. The third fiber-plastics composite section 3 arranged on an external side in turn increases the stiffness of the hybrid molding 7 and improves the dimensional stability of the hybrid molding 7. In this type of embodiment it is also possible that the second fiber-plastics composite section 2 extends beyond the plastics foam element 10 in a manner such that the second fiber-plastics composite section 2 forms a pipe end piece. For the other embodiments it is advantageous to arrange an external and/or internal layer in the region of the pipe end.

Figure 6:
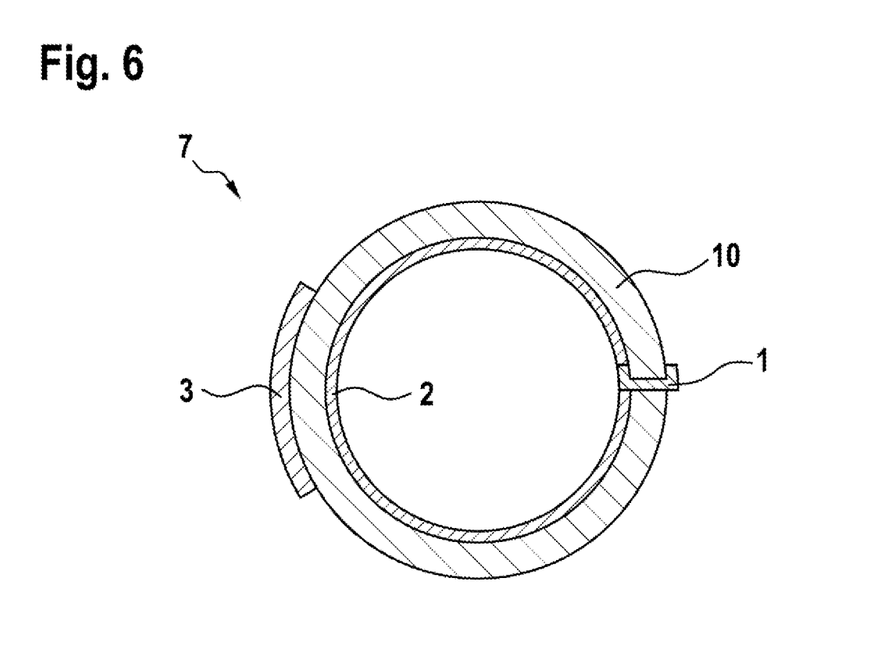
FIG. 6 is a cross-sectional view through the hybrid molding according to FIG. 5 taken along the section line VI-VI'.

For the production of the third embodiment of the hybrid molding 7, the plastics foam element 10 is advantageously first inserted into a mold and covered at two opposite lateral edges of the plastics foam element 10 by a first fiber-plastics composite section 1 and on the surface opposite to the mold by the second fiber-plastics composite section 2. The second fiber-plastics composite section 2 here covers the entire area of the plastics foam element 10. The plastics foam element 10, the first fiber-plastics composite section 1 and the second fiber-plastics composite section 2 are shaped by the mold and exposed to a first temperature TF which is suitable for lowering the viscosity of the resin in the fiber-plastics composite to a minimum as a consequence of the temperature, and also brings about this effect. The resin therefore escapes from the fiber-plastics composite and wets, or penetrates peripherally into the open pores of the plastics foam element.

The mold is then exposed to a second temperature T1, where the second temperature T1 is higher than the temperature TF and lies between the glass transition temperature and the melting point of the plastics foam element 10. The temperature T1 is also suitable for hardening the fiber-plastics composite sections 1, 2 with respect to the resin thereof, and also brings about this effect. The plastics foam element is thus fixed mechanically on the fiber-plastics composite.

The mold is then cooled, and the resultant semi finished product is removed. In a subsequent step, a third fiber-plastics composite section 3 is placed into a further mold and covered by the semi finished product. The hybrid molding 7 is shaped by means of the further mold. The mold is then exposed to the second temperature T1 and to a third temperature TS, which is higher than the temperature T1 and which is suitable to bring about shrinkage in the plastics foam element 10 in order that its shape conforms to that of the mold, and also to achieve a final shape of the element, and which also brings about this effect. At the temperature T1 here the third fiber-plastics composite section 3 is also hardened and bonded to the semi finished product to give the hybrid molding 7. The mold is then cooled for the removal of the hybrid molding 7.

In this connection, FIG. 4 by way of example depicts how insertion of the plastics foam element 10 into the mold initially results in compression (indicated by hatching) of the material at the radially inward-facing mold surface 12; this leads to an uneven or corrugated surface 12. Exposure first to the temperature TF and subsequently to the temperature T1 here again bonds the plastics foam element 10 to the fiber-plastics composite sections 1-4 and/or secures the element mechanically thereon. The corrugated shape of the surface 12 is initially retained here. However, exposure to the third temperature TS then results in controlled shrinkage in the plastics foam element 10. During this, that section of the plastics foam element 10 that is not fixed on the fiber-plastics composite sections 1-4, namely the surface 12, is subjected to shrinkage and thus smoothed by tension to give the smooth surface 12 depicted, extended by tension.

Figure 7:
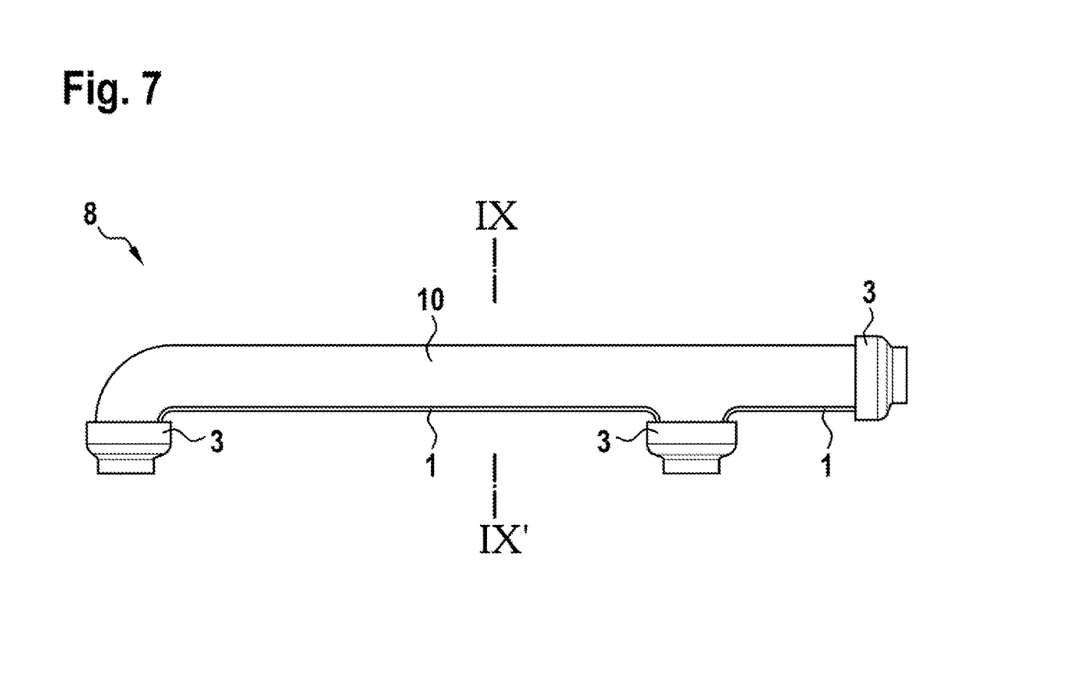
FIG. 7 is a side view of a fourth embodiment of a hybrid molding according to the invention.

FIG. 7 shows a fourth embodiment of a hybrid molding 8. The hybrid molding 8 is a pipe with an end section facing in a different direction, and with a branch. A pipe end piece has been formed in each of the three connection points of the hybrid molding 8. The plastics foam element 10 has a seam made of first fiber-plastics composite sections 1. The pipe end pieces are composed of third fiber-plastics composite sections 3.

Figure 8:
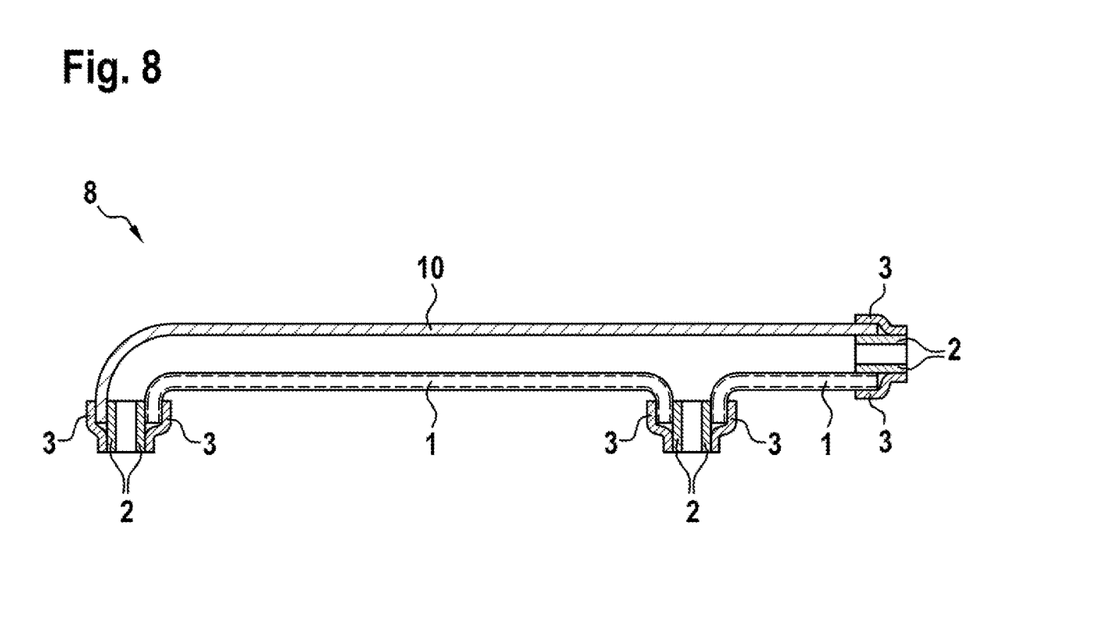
FIG. 8 is a longitudinal sectional view through the hybrid molding.

FIG. 8 shows a cross section of the hybrid molding 8. The cross section of the hybrid molding 8 reveals that the third fiber-plastics composite sections 3 extend beyond the ends of the plastics foam element 10. These have been reinforced, as shown in FIG. 8, by second fiber-plastics composite sections 2, one side of which covers the plastics foam element 10 and the other side of which respectively covers the third fiber-plastics composite section 3.

Figure 9:
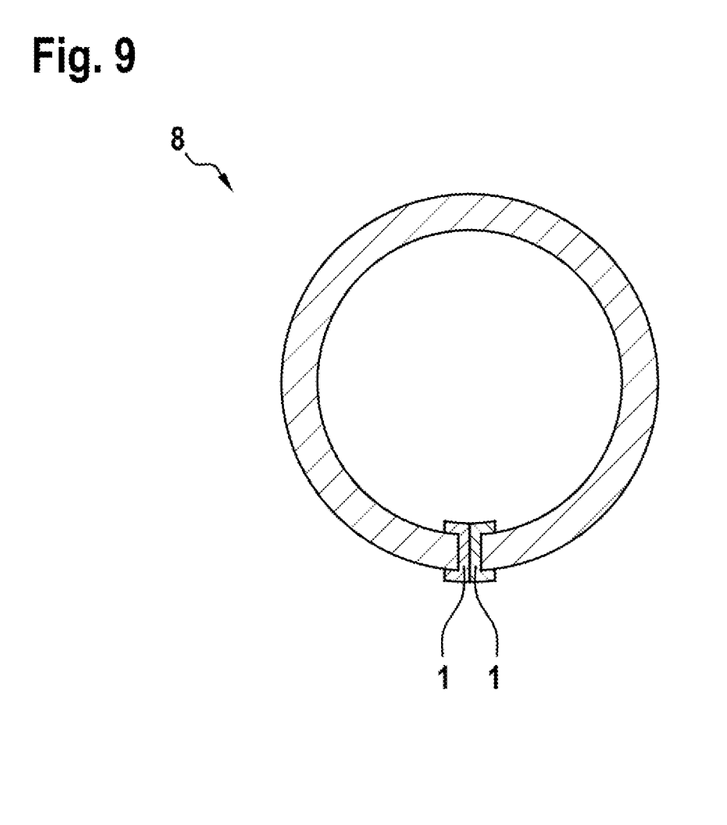
FIG. 9 is a cross-sectional view through the hybrid molding according to FIG. 7 take along the section line IX-IX'.

FIG. 9 shows a cross section of the hybrid molding 8 according to FIG. 7 along the section line IX-IX'. In this Inventive Example, the plastics foam element 10 is held in the shape of a pipe by two first fiber-plastics composite sections 1 which respectively form a U profile.

Figure 10:
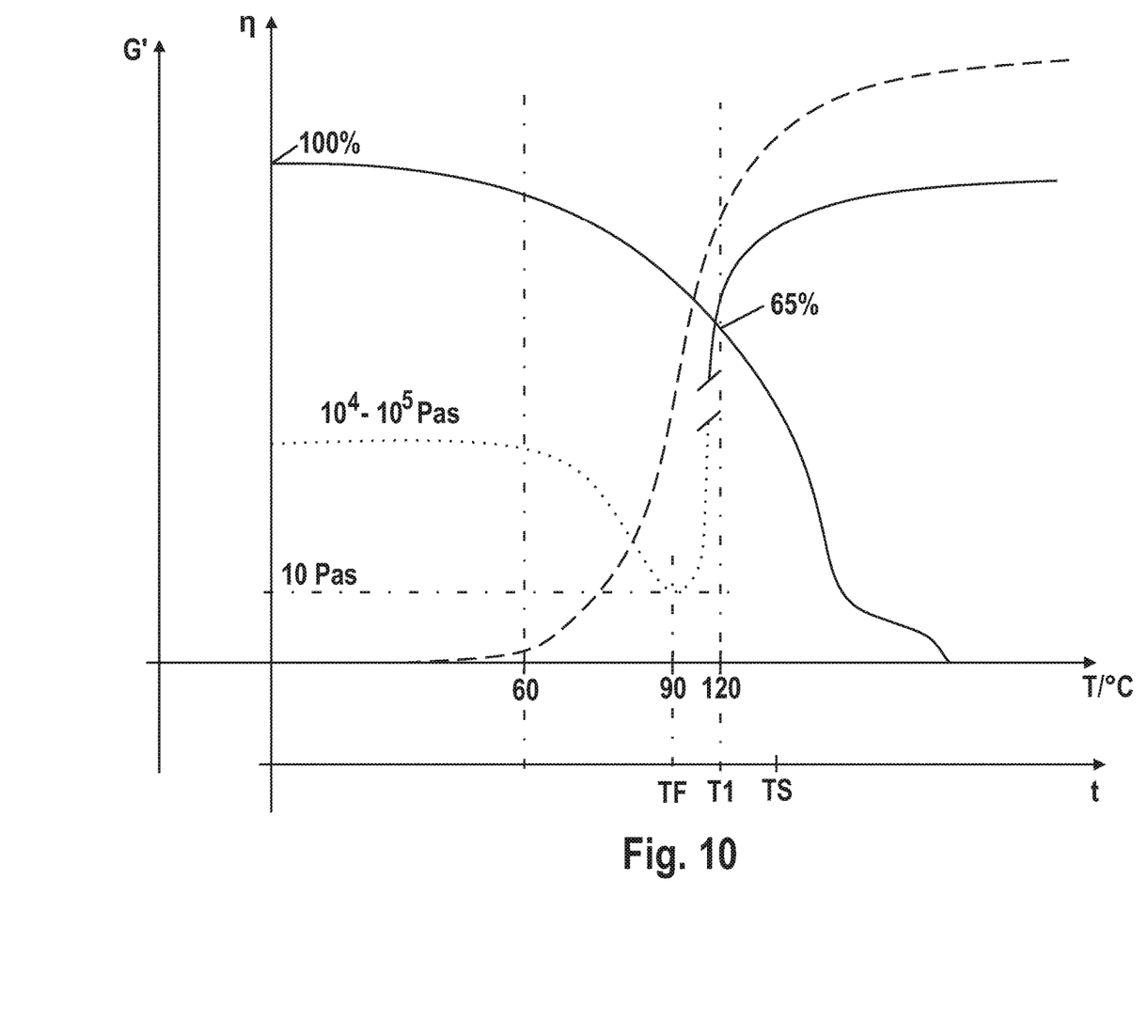
FIG. 10 is a graph showing a plot of various material-related variables against time and temperature during the implementation of the process of the invention.

FIG. 10 shows a symbolic representation of the plot of various variables against both time t and temperature T during the production process of the invention. The continuous line shows the plot of a shear modulus G' for an amorphous thermoplastic or amorphous phases in a semicrystalline thermoplastic (possible materials for the plastics foam element). The broken line represents the corresponding shear modulus of a thermoset ("resin" in the fiber-plastics composite). The dotted line shows the plot of viscosity n for the same thermoset.

It is seen from FIG. 10 that, starting from room temperature, the temperature initially rises in the process. At a temperature of about 60° C. the viscosity of the thermoset starts to fall from the initial value of from 104 to 105 Pas until at the temperature TF=90° C. it reaches its minimum at about 10 Pas. At this stage in particular, the resin penetrates into the open-pore surface of the plastics foam element. There has not yet been any onset of noticeable shrinkage in the plastics foam element, since its shear modulus has not yet substantially decreased. The time for which the temperature TF is maintained here is sufficiently long, or passage through a temperature range surrounding this temperature is sufficiently slow, to permit adequate penetration.

With further expiry of time and with temperature rising towards the temperature T1=120° C., the viscosity of the resin rises in almost stepwise fashion to many orders of magnitude above the initial viscosity of from 104 to 105 Pas. The corresponding line in the graph has therefore been symbolically interrupted in order to represent the disproportionate change. The shear modulus of the resin simultaneously rises, i.e. the overall effect is that the fiber-plastics composite hardens. The time for which the temperature T1 is maintained here is sufficiently long, or passage through the temperature range surrounding this temperature is sufficiently slow, to permit sufficient hardening of the resin.

The hardening of the resin is terminated or completed via a further rise in temperature to the temperature TS=150° C. in the course of the further process.

The further course of the shear modulus curve for the plastics foam element is therefore valid only for those regions that are not held or fixed by the fiber-plastics composite and that are thus subject to restricted shrinkage. In the region of, or at, the temperature TS the shear modulus falls further and controlled shrinkage takes place, and the plastics foam element thus achieves a desired shape. To this end, again, the temperature TS is again maintained for a sufficiently long time, or passage through a temperature range surrounding this temperature is sufficiently slow.

In those regions of the plastics foam element that, in contrast, have been fixed on the fiber-plastics composite, no further movement of any kind, or shrinkage of any kind, takes place; this is indicated symbolically in FIG. 10 by a broken-line constant continuation of the shear modulus curve starting at the juncture of T1.

The following is a summary list of reference numerals and the corresponding structure used in the above description of the invention:

1 First fiber-plastics composite section
2 Second fiber-plastics composite section
3 Third fiber-plastics composite section
4 Fourth fiber-plastics composite section
5 Hybrid molding
6 Hybrid molding
7 Hybrid molding
8 Hybrid molding 10 Plastics foam element
12 Surface

The invention claimed is:

1. A process for producing a tubular hybrid molding made of a plastics foam element and a fiber-plastics composite, the plastics foam element having a temperature-dependent shrinkage, which comprises the following steps of:
    a) inserting the plastics foam element, at least one first fiber-plastics composite section in an unhardened state and at least one second fiber-plastics composite section in an unhardened state into a mold, the first fiber-plastics composite section being inserted along one lateral edge of the plastics foam element and the second fiber-plastics composite section at least to some extent covering the plastics foam element, wherein regions of a surface of the plastics foam element covered by the first and second fiber-plastics composite sections have open pores;
    b) shaping the plastics foam element, the at least one first fiber-plastics composite section and the second fiber-plastics composite section by means of the mold to give a preliminary shape in a manner such that the first fiber-plastics composite section forms a sandwich structure with two lateral edges of the plastics foam element;
    c) exposing the mold to a first temperature which is suitable to lower a viscosity of a resin in the first and second fiber-plastics composite sections to a minimum as a consequence of temperature;
    d) exposing the mold to a second temperature which is higher than the first temperature and which is suitable to harden the first and second fiber-plastics composite sections in respect of the resin thereof, and the second temperature lies between a glass transition temperature and a melting point of the plastics foam element, wherein the plastics foam element becomes fixed mechanically on the first and second fiber-plastics composite sections;
    e) exposing the mold to a third temperature which is higher than the second temperature and which is suitable to bring about shrinkage in the plastics foam element, in order that a shape of the plastics foam element conforms to that of the mold, and to achieve a final shape of the plastics foam element; and
    f) cooling the mold and removing the tubular hybrid molding.

2. The process according to claim 1, wherein the first and second fiber-plastics composite sections are disposed along various directions of the plastics foam element in a manner such that shrinkage of the tubular hybrid molding is restricted to a prescribed shrinkage length.

3. The process according to claim 1, wherein:
    the second fiber-plastics composite section is one of a plurality of second fiber-plastics composite sections; and
    the plastics foam element is covered by the plurality of second fiber-plastics composite sections disposed at a distance from one another.

4. The process according to claim 1, which further comprises producing the plastics foam element from foam having a density from 5 to 100 kg/m$^3$.

5. The process according to claim 1, which further comprises producing the plastics foam element from a foam made of polyvinylidene fluoride or polyvinyl fluoride.

6. The process according to claim 1, wherein the first and second fiber-plastics composite sections contain glass fibers or carbon fibers.

7. The process according to claim 1, which further comprises inserting the second fiber-plastics composite section after the plastics foam element in a manner such that the second fiber-plastics composite section is disposed internally in the tubular hybrid molding.

8. The process according to claim 7, wherein the second fiber-plastics composite section covers an entire area of the plastics foam element.

9. The process according to claim 1, wherein the plastics foam element has been produced from a closed-pore foam, where before performing the step a) the plastics foam element is trimmed at at least surface regions that are to be fixed mechanically on the fiber-plastics composite.

10. The process according to claim 7, which further comprises inserting at least one third fiber-plastics composite section, where the third fiber-plastics composite section is inserted before the plastics foam element in a manner such that the third fiber-plastics composite section is disposed on an external side of the tubular hybrid molding.

11. The process according to claim 10, wherein:
    the at least one third fiber-plastics composite section is one of a plurality of third fiber-plastics composite sections; and
    a fourth fiber-plastics composite section, the third and fourth fiber-plastics composite sections are in a form of a strip and are disposed in a manner such that the plastics foam element is stabilized in a skeletal matrix.

12. The process according to claim 7, wherein:
    the plastics foam element, is shaped according to step b) with the at least one first fiber-plastics composite section and with the at least one second fiber-plastics composite section being disposed on an internal side; and
    according to the steps c) and d), the system is exposed to the first and second temperatures and then is removed from the mold and then, with at least one third fiber-plastics composite section and/or fourth fiber-plastics composite section is placed according to the steps a) and b) into a further mold and there according to steps c) to f) undergoes finishing processes in a manner such that the third fiber-plastics composite section and/or the fourth fiber-plastics composite section is disposed on an external side of the tubular hybrid molding.

13. The process according to claim 11, which further comprises disposing at least one of the first, second, third and fourth fiber-plastics composite sections in a plurality of layers.

14. The process according to claim 3, which further comprises inserting at least one of the second fiber-plastics composite sections on at least one side of the plastics foam element in a manner such that a pipe end piece is formed therefrom.

15. The process according to claim 10, which further comprises inserting the third fiber-plastics composite section on a side of the plastics foam element in a manner such that a pipe end piece is formed therefrom.

16. The process according to claim 1, which further comprises selecting the second temperature in a manner such that a value of a shear modulus of the plastics foam element has fallen at most to 50% of its value at 20° C.

17. The process according to claim 1, wherein at a juncture no later than a start of the step e) inserting a pressurizer into a cavity of the tubular hybrid molding to be produced, and at a juncture no later than during the step e) the pressurizer is used to exert an internal pressure onto the plastics foam element.

18. The process according to claim 10, wherein the skeletal matrix is a thorax-shaped matrix.

* * * * *